Dec. 15, 1942.    M. W. CREW    2,304,801
ELECTRIC DRAFT AND PRESSURE CONTROL GAUGE
Filed April 19, 1941

INVENTOR
MORRIS W. CREW
BY
Hyde and Meyer
ATTORNEYS

Patented Dec. 15, 1942

2,304,801

UNITED STATES PATENT OFFICE 2,304,801

ELECTRIC DRAFT AND PRESSURE CONTROL GAUGE

Morris W. Crew, Shaker Heights, Ohio, assignor to The Hotstream Heater Company, Cleveland, Ohio, a corporation of Ohio Application April 19, 1941, Serial No. 389,306

8 Claims. (Cl. 200—56)

This invention relates to improvements in electric gauges for the control of draft and pressure, wherein changes of draft or pressure conditions cause variations in electrical connections so that control devices are operated correspondingly.

One of the objects of the present invention is to provide a gauge which is very sensitive to changes in draft or pressure, together with means for transmitting the motion of this gauge to an electrical control device which is practically frictionless so that a very accurate control is achieved.

Another object of the present invention is to provide a gauge which moves in response to changes in position of a flexible diaphragm wherein all of the movable parts are counterbalanced and the movable gauge operates in opposition to a pendulum weight. The movement of these parts is then transmitted to electric make and break mechanism with a minimum amount of friction.

Another object of the present invention is to provide a control instrument wherein an arm moves in response to changes in draft or pressure conditions, a second arm is relatively fixed, a disk carrying make and break contacts is oscillatably mounted upon one of the arms and the other arm engages the disk at a point removed from its center so that relative motion between the arms provides make and break movement of the switch.

Other objects and advantages of the present invention will be apparent from the accompanying drawing and description and the essential features thereof will be summarized in the claims.

Figure 1:
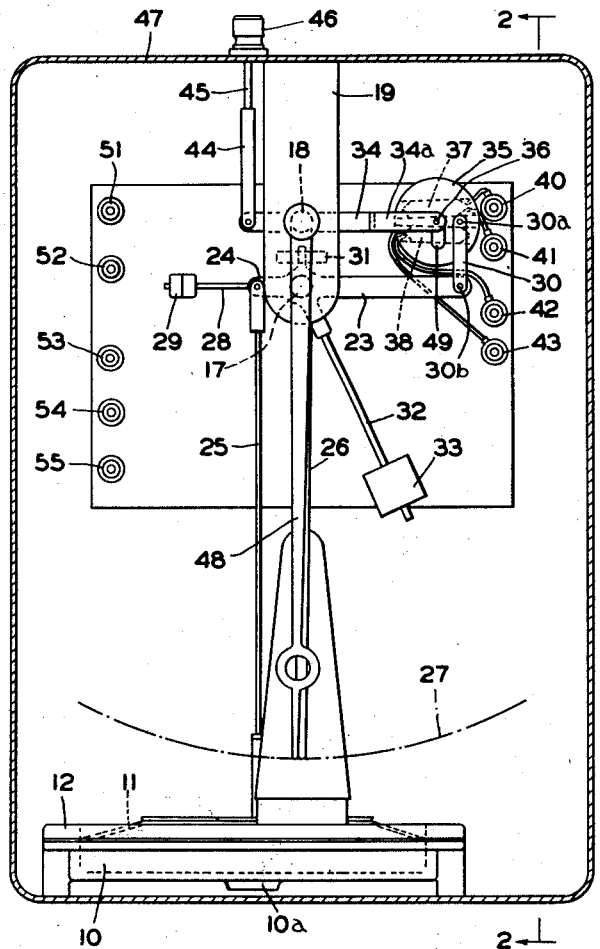
Figure 2:
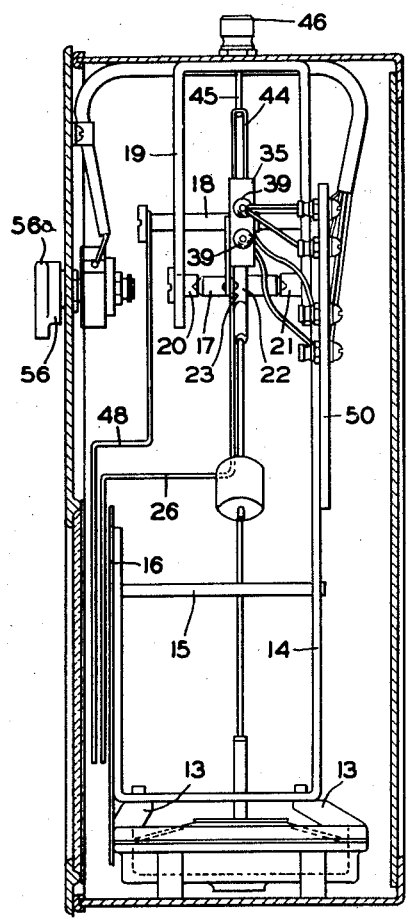
Figure 3:
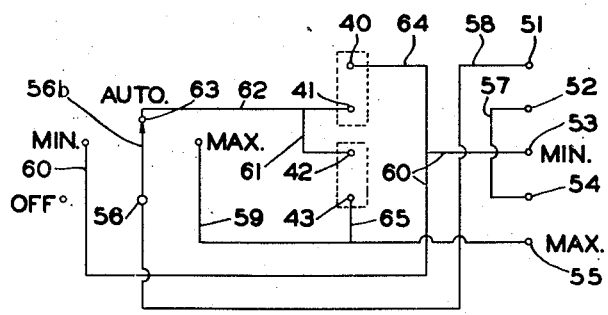

In the drawing, Fig. 1 is a front elevation of one embodiment of my improved instrument with the front cover removed to more clearly show the parts; Fig. 2 is a sectional view of the same taken along the line 2—2 of Fig. 1 and with the casing cover in position; while Fig. 3 is a wiring diagram illustrating one use of my invention.

In the drawing, I have shown a pressure chamber 10 comprising a hollow base open at the top where the chamber is completed and closed by the flexible diaphragm wall 11 wherein the diaphragm is secured at its edges by a frame 12 secured to the base member. A draft connection may be made at the threaded boss 10a as will be readily understood. Mounted upon the base as by means of the pedestal members 13 is a U-shape bracket 14 having parallel front and rear arms extending upwardly and connected together by a spacer and stiffener bar 15. On the front bracket arm is mounted an indicating dial 16. At the upper end of the rear bracket arm is supported a pair of shafts 17 and 18. One manner of supporting these shafts is by means of the inverted U-shape bracket 19 which if desired may be a part of or fastened to the bracket 14. The shaft 17 is mounted in a frictionless manner as by the pointed ends thereof being mounted in cone cups 20 and 21 carried by the bracket 19. On the shaft 17 is a hub member 22 which carries an arm 23 extending in one direction from shaft 17. Extending in the opposite direction from shaft 17 is a short arm 24 to which is pivotally connected a link 25 extending downwardly and connected at its lower end to the diaphragm 11 by suitable plates and gaskets. It results from this construction that upward and downward movement of the diaphragm 11 results in oscillation of arm 23 about shaft 17 as an axis. Upon a downward extension of hub 22 is mounted a pointer 26 which indicates on a scale 27 of dial 16 the draft present in the chamber 10.

The parts just mentioned are counterbalanced about the axis 17. To this end a rod 28 extends oppositely to arm 23 and carries a counterweight 29 which balances the arm and the link 30 and other parts attached to the arm. Another counterweight 31 extends in a direction opposite to pointer 26 and balances this pointer about the shaft 17. A pendulum arm 32 extends downwardly from the hub 22 and carries a pendulum weight 33. This weight hangs vertically downward when the gauge is at zero and movement of the gauge over its dial is against the tendency of weight 33 to return to its position vertically below the axis 17.

A second arm 34 is mounted on shaft 18. This arm has a bifurcated end at 34a between the two branches of which is oscillatably mounted a disk 35 preferably of fiber or some electrically non-conducting material. Preferably this fiber disk will have a friction reducing bearing on its axis pin 36. Mounted in any suitable manner on the disk 35 are two mercury switches 37 and 38. As seen in Fig. 1 the contacts of switch 37 are toward the right and those of switch 38 are toward the left and when the switches are in their neutral position as shown they lie at approximately 5° to the horizontal with switch 37 inclined slightly upwardly toward the right and switch 38 inclined slightly downwardly toward the right. This is a common arrangement of two mercury switches wherein the contacts of one are made as the contacts of the other are broken. I find a suitable method of mounting these switches in the disk 35 is to place them in drilled openings 39 as indicated. Flexible wire connections from the switches lead to the binding posts 40, 41, 42 and 43. A link 30 is pivotally connected at 30a to disk 35 at a point spaced from its center and the other end of the link is pivotally connected at 30b to the arm 23. The end of arm 34 on the opposite side of shaft 18 is pivotally connected by clevis 44 and rod 45 to a set screw 46 mounted on the top of the casing 47. By turning the screw 46 the position of arm 34 is set as desired thus fixing the neutral position of the switches on disk 35. This neutral position or selected control point is indicated by a pointer 48 which moves with shaft 18.

Looking at Fig. 1, it will be noted that as arm 23 moves relative to arm 34, the link 30 will cause disk 35 to oscillate about its axis pin 36. Movement of the disk in counterclockwise direction will cause link 30 to strike against pin 36 thus limiting movement in that direction. A projection 49 on arm 34 will limit movement of link 30 as the disk oscillates in a clockwise direction so as to prevent overcenter movement of the pivot point 30a toward the left in Fig. 1.

The parts have been shown in Fig. 1 in the neutral position of the switches when the control pointer 48 is set at approximately the mid point of scale 27. Obviously as higher and lower points are selected on the scale 27 the arms 34 and 23 will move to positions parallel to each other and above or below the position indicated in Fig. 1. In other words in various settings of the pointer 48 the parts will have approximately the same relative setting as there shown and the parts will function as subsequently described.

To the rear arm of bracket 14 is secured the wiring panel 50. This carries the binding posts 40 to 43 already described on one side and at the other side are binding posts 51 and 52 for connection to a source of electric current, and binding posts 53, 54 and 55 for connection to the control member to be moved by the control apparatus in response to movement of the diaphragm 11.

On the front wall of the casing is mounted a control knob 56 with a pointer 56a moving over suitable designations on the front wall of the casing so as to set the device as desired. The connections controlled by the knob 56 are indicated in Fig. 3. In the middle or automatic position the apparatus functions as will presently be described, whereas when turned to the maximum position the control device will run in the maximum direction say to open a damper, and on the minimum position on the other side the control member will run to its other limit, as for instance to the minimum opening of a control damper. The use of the "off" button is obvious.

Referring now to the diagram of Fig. 3, it will be noted that the binding post 52 which is connected to one side of the outside source of electricity is connected by line 57 to binding post 54 which is the common line of the three which lead to the controlled device. The other side of the outside line connected to binding post 51 communicates through line 58 with one end of switch 56b which is controlled by knob 56 for the purpose of selecting one of the control buttons indicated in the diagram. For automatic operation this switch is in the full line position shown in Fig. 3. The maximum control button is connected by line 59 with binding post 55 and the minimum control button is connected by line 60 with binding post 53. The binding posts 41 and 42 are connected together by a line 61 and are jointly connected by line 62 to the automatic control button 63. Binding post 40 is connected by line 64 and line 60 to binding post 53. Binding post 43 is connected by line 65 and line 59 to binding post 55.

The operation of my control device with switch 56b on the automatic control button 63 is as follows: With the switches 37 and 38 in neutral position, no current flows and the controlled device (not shown) is idle. Upon clockwise movement of arm 23 responsive to diaphragm 11 link 30 moves disk 35 in a clockwise direction thus making contact at the right hand end of switch 37. Current then flows from binding post 51 through line 58, switch 56b, line 62, binding post 41, switch 37, binding post 40 and lines 64 and 60 to binding post 53 and thence to one side of the controlled device. Thus a circuit is completed because the other side of the device is always connected through line 57 to binding post 52. This causes a movement of the controlled device which eventually should change the pressure in chamber 10 so that pointer 26 will tend to move back toward pointer 48. If movement occurs in the opposite direction from that just described, then contact is made through switch 38 and binding posts 42 and 43 so as to cause a flow of electricity from binding post 51 through line 58, switch 56b, lines 62 and 61, binding post 42, switch 38, binding post 43 and lines 65 and 59 to binding post 55, thus causing movement of the controlled device in the opposite direction to again make the necessary correction. Thus the tendency is always to return the pointer 26 to registration with the set pointer 48 causing the controlled device to hold the desired draft in the chamber 10.

While the device here shown is very useful as a draft control instrument it may be used also for pressure control utilizing a slightly different linkage in place of the link 25 as is fully described and explained in my copending application Serial No. 383,965, filed March 18, 1941.

What I claim is:

1. A control gauge comprising means forming a pressure chamber and having a flexible diaphragm wall, an oscillatable member, connecting means for oscillating said member responsive to movement of said diaphragm wall, a second member, means for fixing said second member in various adjusted positions, a disk carried by one of said members and oscillatable about an axis, means connected with the other of said members abutting said disk at a point spaced from the axis thereof, whereby said disk is oscillated by relative movement between said members, and a control member responsive to disk oscillation adapted to produce a change of position of said diaphragm wall to reverse said relative movement between said members.

2. A control gauge comprising means forming a pressure chamber and having a flexible diaphragm wall, an oscillatable member, connecting means for oscillating said member responsive to movement of said diaphragm wall, a member fixed relative to said oscillatable member, means for holding said last named member in various adjusted positions, a disk carried by said fixed member, said disk being oscillatable about an axis, means connected with said oscillatable member abutting said disk at a point spaced from the axis thereof, whereby said disk is oscillated by relative movement between said members, and a control member responsive to disk oscillation adapted to produce a change of position of said diaphragm wall to reverse said relative movement between said members.

3. The combination of claim 1 wherein said oscillatable member oscillates about an axis and including means balancing about said axis said oscillatable member and parts carried thereby and balancing said connecting means, and pendulum means effective on said oscillatable member to govern its oscillation.

4. A control gauge comprising means forming a pressure chamber and having a flexible diaphragm wall, an arm mounted for oscillation about an axis, connecting means for oscillating said arm responsive to movement of said diaphragm wall, a pointer oscillatable by said arm, means counterweighting said arm and connecting means and pointer so that all these parts are in balance about said axis, a settable arm, a control member, and means for operating said control member by relative movement between said arms.

5. A control gauge comprising means forming a pressure chamber and having a flexible diaphragm wall, an arm mounted for oscillation about an axis, connecting means for oscillating said arm responsive to movement of said diaphragm wall, a pointer oscillatable by said arm, means counterweighting said arm and connecting means and pointer so that all these parts are in balance about said axis, a pendulum weight acting on said arm to return said pointer toward zero, a settable arm, a control member, and means for operating said control member by relative movement between said arms.

6. A control gauge comprising means forming a pressure chamber and having a flexible diaphragm wall, two substantially parallel arms having pivotal mountings at one end thereof, a link connecting the other ends of said arms, connecting means for oscillating one of said arms responsive to movement of said diaphragm wall, a disk oscillatably mounted on the link-connected end of one of said arms for rotation in a plane parallel to the plane of oscillation of said arms, said link being connected with said disk at a point spaced from its center, and a mercury switch mounted on said disk for opening and closing iof its contacts by disk oscillation.

7. A control instrument comprising a movable controlling device, an oscillatable member, connecting means for oscillating said last named member responsive to movement of said controlling device, a second member, means for fixing said second member in various adjusted positions, a disk carried by one of said members and oscillatable about an axis, means connected with the other of said members abutting said disk at a point spaced from the axis thereof, whereby said disk is oscillated by relative movement between said members, and a mercury switch on said disk operated by disk oscillation adapted to produce a change of position of said diaphragm wall to reverse said relative movement between said members.

8. A control gauge comprising means forming a pressure chamber and having a flexible diaphragm wall, an oscillatable member, connecting means for oscillating said member responsive to movement of said diaphragm wall, a second member, means for fixing said second member in various adjusted positions relative to said first member, a bracket having a pivotal mounting on one of said members, means connected with the other of said members abutting said bracket at a point radially spaced from said pivotal mounting, whereby said bracket is tilted by relative movement between said members, and a control member responsive to bracket tilting and adapted to produce a change of position of said diaphragm wall to reverse said relative movement between said members.

MORRIS W. CREW.